UNITED STATES PATENT OFFICE.

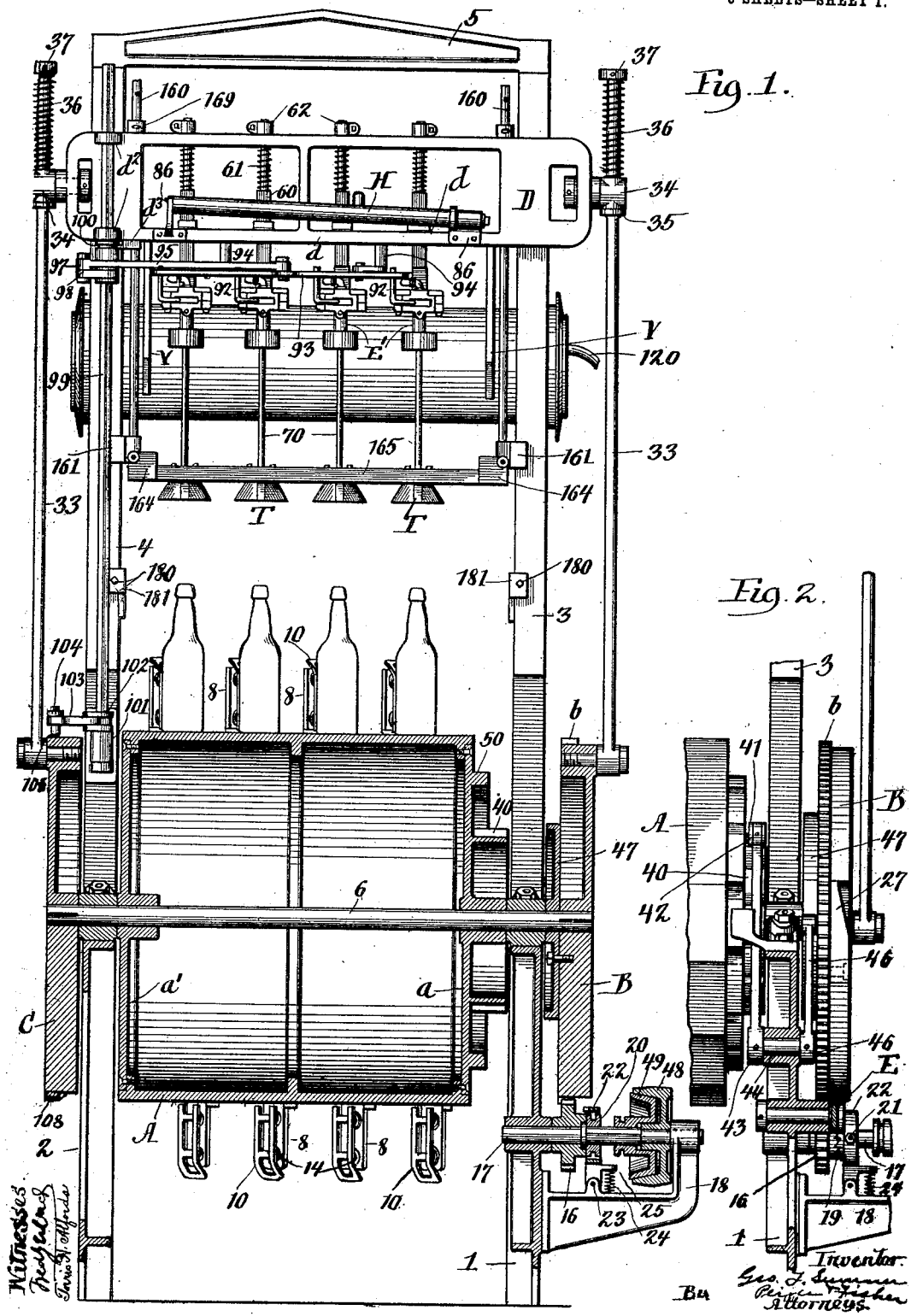

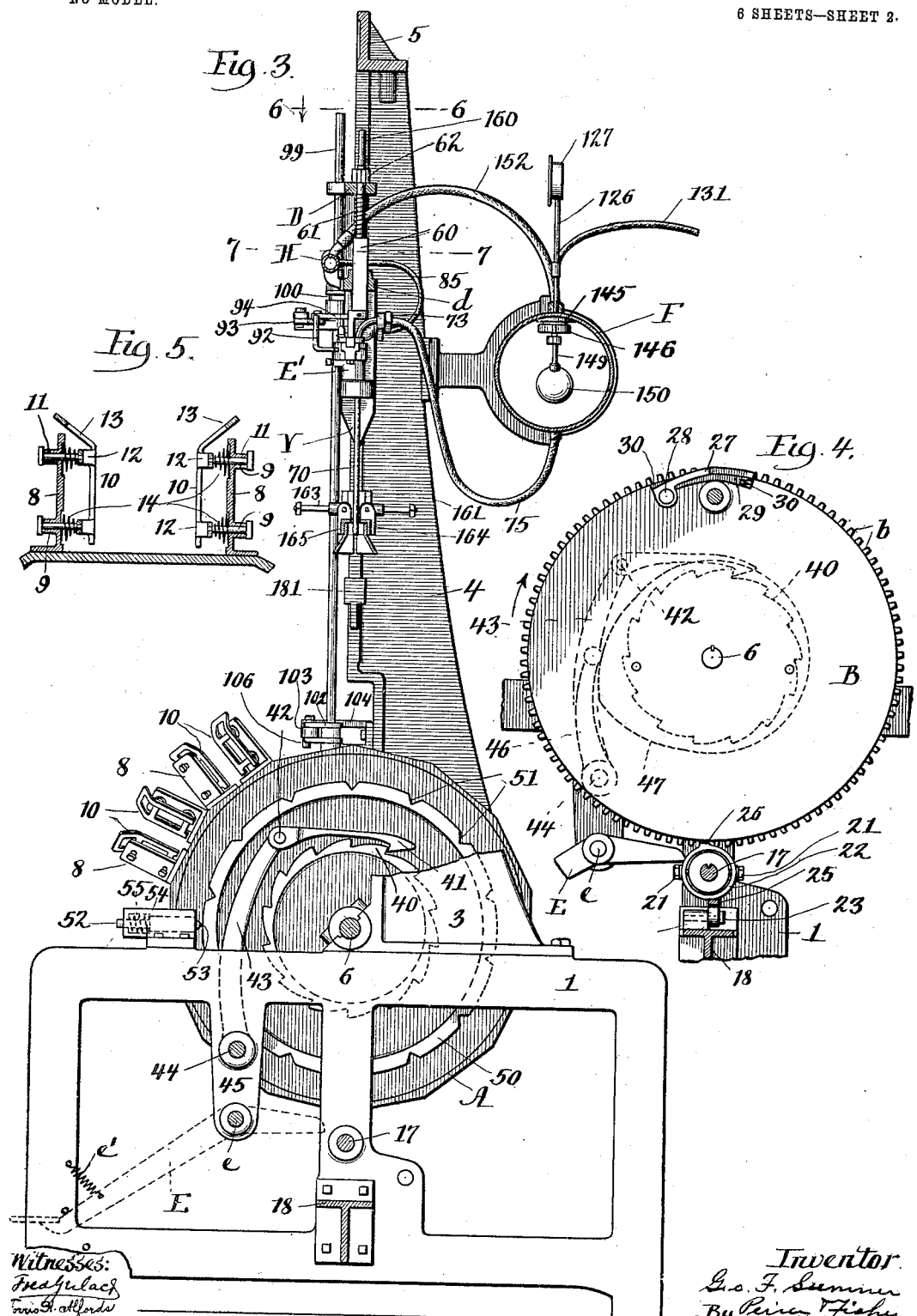

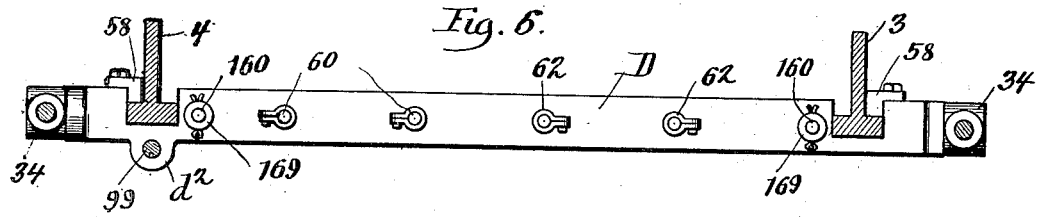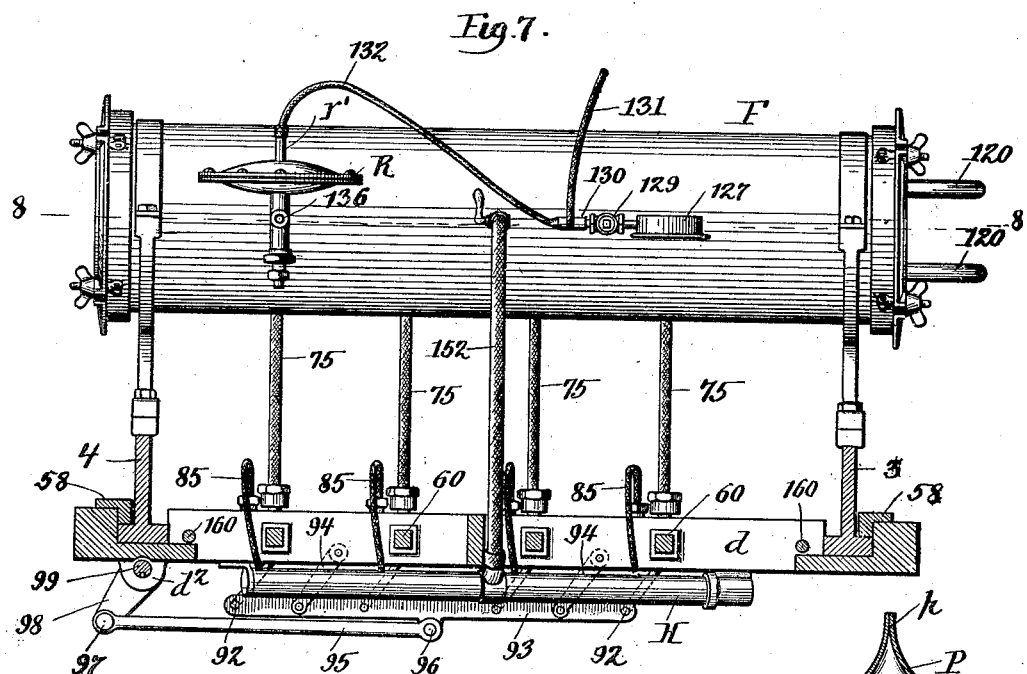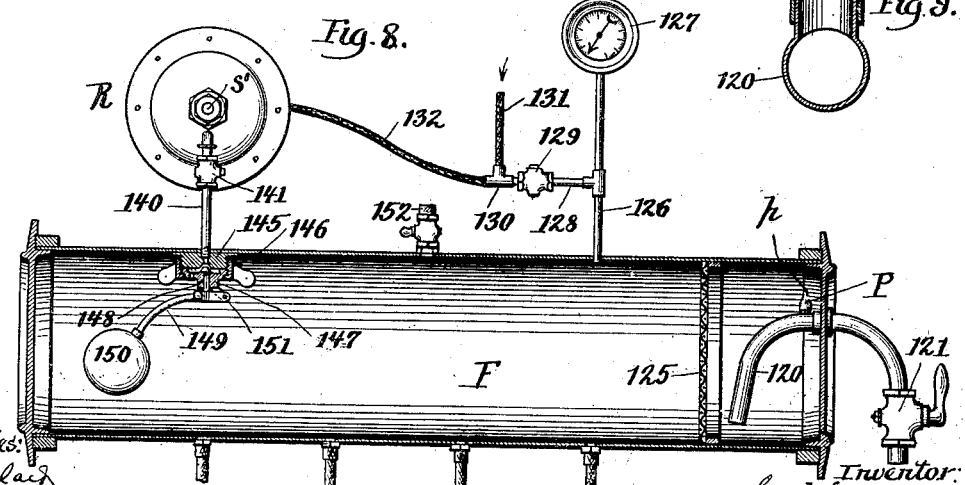

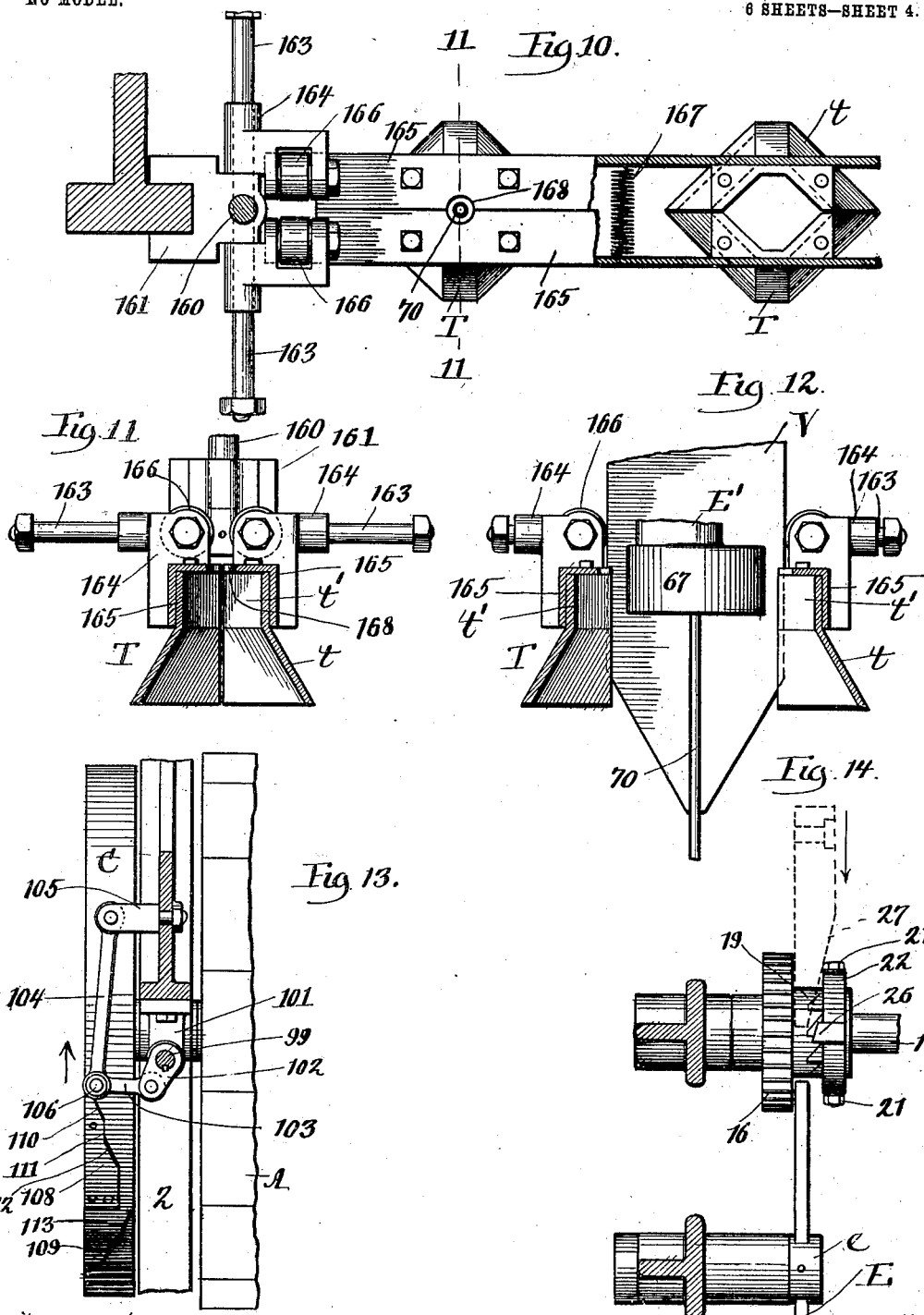

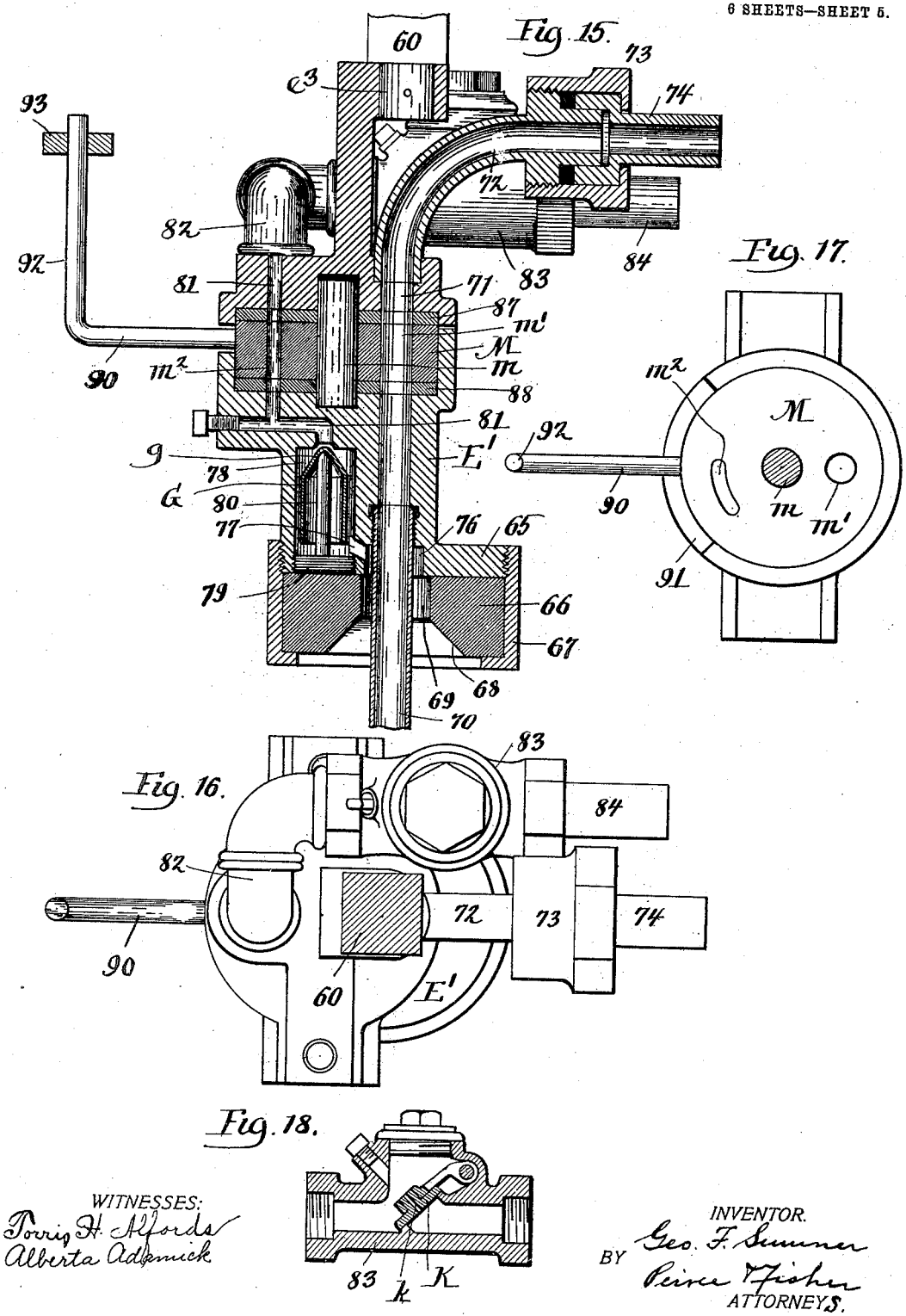

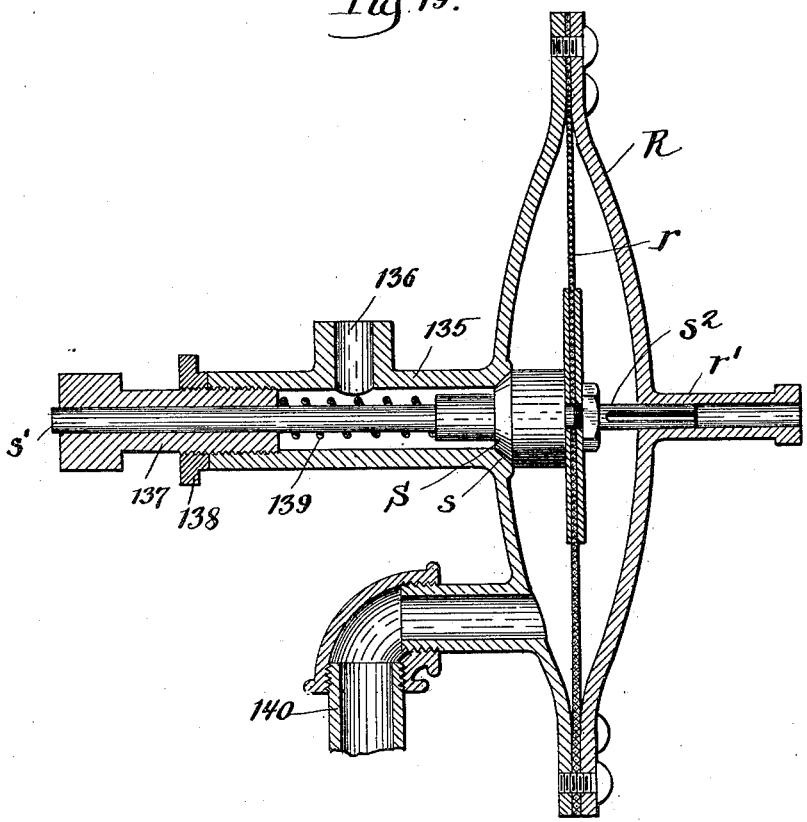

GEORGE F. SUMNER, OF CHICAGO, ILLINOIS, ASSIGNOR TO ALEXANDER B. SCULLY, TRUSTEE, OF CHICAGO, ILLINOIS.

APPARATUS FOR BOTTLING LIQUIDS.

SPECIFICATION forming part of Letters Patent No. 722,263, dated March 10, 1903.

Application filed April 16, 1902. Serial No. 103,130. (No model.)

*To all whom it may concern:*

Be it known that I, GEORGE F. SUMNER, a citizen of the United States, and a resident of Chicago, in the county of Cook and State of Illinois, have invented certain new and useful Improvements in Apparatus for Bottling Liquids, of which the following is a full, clear, and exact description.

This invention has for its object to provide improved apparatus more particularly designed for the bottling of beer and like liquids containing carbonic-acid gas under pressure; and the invention consists in the features of improvement hereinafter described, illustrated in the accompanying drawings, and particularly pointed out in the claims at the end of this specification.

Figure 1 is a view in front elevation of the bottling-machine embodying my invention, the lower portion of the machine being shown in vertical section. Fig. 2 is a detail view, partly in front elevation and partly in vertical section, through the right-hand lower portion of the machine. Fig. 3 is a view of my improved bottling-machine, partly in vertical section and partly in end elevation, certain portions being also broken away for better illustration. Fig. 4 is a detail end view of the bottle-carrier drum and the mechanism beneath it, parts being shown in vertical section. Fig. 5 is an enlarged detail view, in vertical cross-section, through one pair of bottle-holders mounted on the carrying-drum. Fig. 6 is a view in horizontal section on line 6 6 of Fig. 3. Fig. 7 is a view in horizontal section on line 7 7 of Fig. 3, parts being shown in elevation. Fig. 8 is a view in vertical section on line 8 8 of Fig. 7. Fig. 9 is an enlarged detail view, in vertical section, of the by-pass valve in the induction-pipe of the liquid-reservoir. Fig. 10 is an enlarged detail view, partly in plan and partly in horizontal section, through a portion of the main frame and the bottle-guide mechanism. Fig. 11 is a view in vertical section on line 11 11 of Fig. 10. Fig. 12 is a view similar to Fig. 11, but with the parts in different position. Fig. 13 is an enlarged plan view, parts being shown in section, showing part of the mechanism for effecting the automatic operation of the valves that control the flow of air and liquid in the bottling operation. Fig. 14 is an enlarged detail view, partly in elevation and partly in section, showing the automatic clutch mechanism. Fig. 15 is an enlarged view, in vertical section, through one of the filler-heads and adjacent parts, certain parts being shown in elevation. Fig. 16 is a plan view of the casing of one of the filler-heads upon the scale shown in Fig. 15. Fig. 17 is a detail plan view of the disk valve within the filler-head, part of the casing being also shown. Fig. 18 is a view in vertical longitudinal section through the back-pressure valve connected with the air-passage of one of the filler-heads. Fig. 19 is an enlarged view, in vertical section, through the differential relief-valve and connected parts.

The main frame of the machine may be of any suitable construction. As shown this frame comprises side portions 1 and 2, suitably united together, and from the tops of these side portions rise the standards 3 and 4, that are united at their upper ends by a cross-bar 5. Upon the top of the main frame and in suitable bearings is journaled a shaft 6, whereon is loosely mounted the bottle-carrier drum A, the ends of which are closed by the heads $a$ and $a'$, bolted to the interior flanges of the drum. Preferably the exterior of the drum A is of polygonal rather than of cylindric outline, and the polygonal surfaces of the drum are provided with transverse rows of devices whereby the bottles will be held during the filling operation. The preferred means for holding the bottles is illustrated more particularly in Figs. 1 and 5 of the drawings, and each of these bottle-holders consists of a pair of uprights 8, having flanged bases bolted to the periphery of the drum and provided with holes through which pass the headed stems 9 of the bottle jaws or clamps 10. Preferably, also, the uprights 8 are provided upon their backs with perforated extensions 11, cast thereon to better guide the stems 9. As shown, each of the jaws 10 comprises curved ribs 12, to which the inner ends of the stems 9 are secured, and the tops of the jaws 10 are flared outwardly, as at 13, to enable the more ready insertion of the bottles between the jaws. Between the clamping-jaws 10 and the uprights 8 and encircling the stems 9 are interposed coil-springs 14, that serve to normally force the jaws toward each other, and thus securely retain the bottles within the jaws. The improved bottle-holders are arranged in transverse rows across the face of the drum and around its entire periphery, and in order to economize space the jaws of the bottle-holders and their supports are set diagonally, as shown in the drawings.

It will be understood, of course, that the bottle-carrier drum may be made of any desired length and may be equipped with any desired number of bottle-holders, depending upon the size and capacity desired for the machine.

Upon the opposite ends of the drum-shaft 6 are keyed revoluble parts, such as the disks B and C. The periphery of the disk B is formed with an annular gear $b$, engaging a pinion 16, that is loosely mounted upon a shaft 17, one end of which shaft is journaled in the side 1 of the main frame, while the opposite end of this shaft is journaled in a bracket 18, that is bolted to the side 1 of the main frame. (See Fig. 1.) The hub of the pinion 16 is formed with teeth 19, that comprise one member of a controlling-clutch, the opposite member 20 of this clutch being splined upon the shaft 17, so as to revolve constantly with the shaft. The clutch member 20 is formed with an annular peripheral groove, into which extend the ends of pins 21, that project from a yoke 22, that surrounds the clutch member 20. The yoke 22 is pivoted, as at 23, to a lug projecting upward from the bracket 18, and the yoke 22 is formed with an offset 25, against which bears a coil-spring 24, that serves to normally hold the yoke in the position shown in Figs. 1 and 2, and thus maintain the engagement of the teeth of the clutch members, so as to effect the rotation of the pinion 16 and gear-wheel $b$. The top of the yoke 22 is provided with an inclined or cam-shaped offset 26, (see Fig. 14,) adapted to be engaged by a cam-shaped clutch-shifting device 27, that is carried by the disk B. By reference more particularly to Figs. 2, 4, and 14 of the drawings it will be seen that the clutch-shifting device 27 comprises a plate that is pivoted, as at 28, within a recess 29, formed in the periphery of the disk B. The plate forming the clutch-shifting device 27 has its forward end portion inclined or wedge-shaped, and this portion of the plate stands normally beyond the periphery of the disk B, as seen in Fig. 4, so that when the disk B in its revolution brings the plate 27 opposite the projection 26 of the yoke 22 (see Fig. 14) the wedge-shaped end of the plate 27 will engage the inclined end of the offset 26 and will force this offset 26 and the yoke 22, to which the offset is attached, outward, thereby releasing the teeth of the clutch member that is connected to the yoke. The square end of the shifting device 27 serves to limit the outward swing of this device; but when the clutch-shifting device 27 approaches its lowermost position it will swing away from its seat and will then be in position to engage the cam-shaped extension or part 26 on the clutch-yoke 22. If desired, a spring 30 may be placed beneath the shifting device 27 to force it normally outward, although this is not deemed essential. The disks B and C are connected by pitman-rods 33 to a cross-head D, whereby the vertical reciprocation of the filler-heads and associated parts will be effected, and the purpose of the clutch mechanism is to insure the automatic arrest of the filler-heads and of the bottle-carrying drum at the proper times, as will presently more fully appear. As shown, each of the pitman-rods 33 passes upward through a hole in a pivoted stud 34, projecting from the end of the cross-head D, each pitman-rod being furnished with a shoulder 35 to bear against the corresponding stud 34, and above each of the studs 34 and encircling the upper end of the corresponding pitman-rod is placed a coiled spring 36, that is held upon the pitman-rod by means of a collar 37, that may be adjusted to different positions upon the end of the pitman-rod.

In order to effect a step-by-step revolution of the bottle-carrying drum A, the mechanism next to be described is preferably employed. The head $a$ of the drum is provided with a ratchet wheel or rim 40, the teeth of which correspond in number and arrangement to the rows of bottle-holders upon the periphery of the drum. Preferably the ratchet wheel or rim 40 is cast integral with the head $a$ of the drum. With the teeth of the ratchet wheel or rim 40 engages a drive-pawl 41, (see Figs. 3 and 4,) that is pivoted, as at 42, to the upper end of an arm 43, mounted upon a rock-shaft 44, journaled in a depending extension or suitable part 45 of the main frame. To the rock-shaft 44 (see Figs. 2 and 4) is also secured a drive-arm 46, the free upper end of which bears against the periphery of a cam or eccentric 47, that is bolted to the disk B or otherwise held so as to revolve with the shaft 6. The shape of the cam or eccentric 47 is clearly illustrated by dotted lines in Fig. 4 of the drawings. Upon the shaft 17 is mounted a drive-clutch, whereby the machine may be thrown into and out of gear with the source of power. As shown, this drive-clutch comprises a pulley 48, over which the drive-belt will pass, this pulley 48 being loosely mounted upon the shaft 17. The pulley 48 is formed upon its interior with a conical friction-surface adapted to be engaged by the cone-shaped rim of the clutch member 49, that is splined to the shaft 17. The clutch member 49 will be provided with the usual means whereby it may be shifted lengthwise upon the shaft 17 in order to throw it into and out of engagement with the pulley 48, so as to effect the starting and stopping of the machine at any desired time.

From the construction of parts as thus far defined it will be seen that if revolution is imparted to the pulley 48 from the source of power and the clutch member 49 is in engagement with the friction-surface of the pulley revolution will be given to the shaft 17, and the clutch member 20 will impart revolution to the pinion 16, which in turn will impart revolution to the gear-wheel $b$, the disks B and C, and the drum-shaft 6. This revolution of the disks B and C will, through the medium of the pitman-rods 33, cause the vertical reciprocation of the cross-head D and parts carried thereby and will also impart revolution to the cam 47, causing this cam, through the medium of the shifter-arm 46, to rock the shaft 44, thereby causing the arm 43 to draw forward the drive-pawl 41, so that the hooked end of this pawl by its engagement with the ratchet-wheel 40 shall impart a partial revolution to the bottle-carrying drum A of sufficient extent to bring a row of bottles into position beneath the cross-head D when the latter descends, carrying with it the filler-heads, &c., as will presently more fully appear. The relative construction and arrangement of the parts are such that the partial revolution thus given to the bottle-carrying drum will be completed shortly after the cross-head D begins its downward movement, and as the cross-head D completes its downward movement the disks B and C will have made a half-revolution and the cam-shaped shifting device 27 will engage the corresponding cam-shaped extension 26 of the yoke 22 and will shift laterally the yoke until the clutch member 20 is thrown out of engagement with the teeth 19 of the pinion 16, thereby arresting the further revolution of the disks B and C and the parts connected therewith. In order to effect the reëngagement of the clutch 20 with the teeth 19 of the pinion 16, a treadle E is preferably employed. This treadle E is pivoted, as at $e$, to the depending extension of the main frame, (see Figs. 3 and 4,) and the short inner end of the treadle extends beneath the rim of the disk B and is adapted to contact with the shifting device 27, so as to force said device into its seat 29, and thus disengage this device 27 from the cam-shaped extension 26 of the yoke 22, thereby allowing the clutch member 20 to reengage the teeth 19 of the pinion 16. The treadle E is normally held in idle position by the coil-spring $e'$, that is connected to the treadle and to the main frame.

In order to insure the accurate positioning of the bottle-carrying drum at the end of each of its partial revolutions, it is preferred to provide the head $a$ of the drum with a rim 50, having a series of V-shaped notches 51, corresponding in number and arrangement with the rows of bottle-holders upon the periphery of the drum, and upon the main frame of the machine is mounted a pawl or detent 52, having a V-shaped end 53, (see Fig. 3,) adapted to ride upon the rim 50 and engage with the correspondingly-shaped notches 51. The detent 52 is mounted to slide within a casing 54 and is forced normally into engagement with the notched rim 50 by a coiled spring 55. Hence it will be seen that at the end of each step-by-step movement of the bottle-carrying drum the V-shaped end of the pawl or detent 52 will snap into the corresponding notch 51, and thus check the further movement of the drum and accurately hold it in position during the filling operation. It will be readily understood, however, that the pawl or detent 52 will not interfere with the revolution of the drum when power is applied thereto.

The cross-head D is mounted to slide upon the T-shaped uprights 3 and 4, (see Fig. 6,) being conveniently held in engagement therewith by blocks 58, that are bolted to the cross-head adjacent its ends. As shown, the cross-head is an open casting, through the top and bottom bars of which extend the stems 60 of the individual filler-heads. (See Figs. 1 and 3.) Each of the stems 60 has its lower portion squared to enter a corresponding hole in the lower bar $d$ of the cross-head, and the upper end of each stem 60 is rounded to pass through a corresponding hole in the upper bar of the cross-head. Upon the rounded portion of each stem 60 is mounted a coil-spring 61, that bears against the upper bar of the cross-head and against the squared portion of the stem 60. A clamp-collar 62 is fixed to each of the stems 60 above the cross-head, and by means of this clamp-collar the corresponding filler-head may be set in accurate position upon the cross-head. There may be any desired number of filler-heads, according to the capacity to be given to the machine, the machine shown being equipped with four of such filler-heads.

The preferred construction of filler-head is that illustrated more particularly in Figs. 15, 16, and 17 of the drawings, and a description of one will answer for all. As shown, each filler-head comprises a body or casing E', formed of upper and lower sections or castings conveniently bolted together, the upper section or casting being secured, as at $e^3$, to the lower end of its corresponding stem 60. In the preferred form of the invention the lower end of each filler-head is provided with a threaded portion 65, against which sets a block or cushion 66, of rubber or like material, that is clamped in position by an interiorly-flanged cap 67, screw-threaded to the part 65. The block or cushion 66, which is adapted to contact with the upper end of the bottle to be filled, is preferably formed with a concaved recess 68, adapted to receive the mouth of the bottle when the filler-head is forced downward thereon. Centrally of the block or cushion 66 is formed an opening 69, through which passes one of the filling-tubes 70. Each of the filling-tubes 70 is a small tube of capillary diameter, and its threaded upper end engages a correspondingly-threaded hole in the body of the filler-head casing E'. The filling-tubes may thus be readily disconnected from the filler-heads, so that tubes of different lengths may be attached to the heads in correspondence with the lengths of bottles to be filled. I have discovered that if the filling-tubes be made of capillary diameter the tubes will remain full of beer or like liquid after the filling-tubes have been lifted from one row of bottles and inserted into the next row. This is a feature of marked advantage, particularly in the bottling of beer, because when the filling-tubes are inserted into the bottles they reach to approximately the bottoms of the bottles, and consequently the beer in descending into the bottles has but a slight distance to travel, and meeting the back pressure of air previously established within the bottles (in manner to be presently defined) is much less liable to become excited and foam than would be possible if the filling-tubes were emptied after each successive row of bottles had been filled. Each filling-head E' is formed with a vertical channel 71, corresponding to the filling-tube beneath it, and each channel 71 is connected by a pipe 72, a coupling 73, and a nipple 74, with a flexible tube 75, (see Figs. 3, 15, and 16,) with the liquid-reservoir F.

In the bottom of each filler-head and around the filling-tube 70 is formed an annular air-space 76, that is connected by a port 77 with the float-valve chamber 78. The bottom of this chamber 78 is preferably closed by a screw-threaded plug 79, having an upright stem 80, that enters and normally supports the float-valve G. Preferably the float valve G is a hollow valve of thin sheet metal, and its rounded upper end $g$ stands normally beneath the air-passage 81, that extends upwardly through the sections of the filler-head and communicates with a pipe 82, that leads from a valve-casing 83. The construction of the valve-casing 83 and the valve therein contained is more particularly illustrated in Fig. 18 of the drawings, and the casing 83 is connected by a short pipe 84 and a rubber tubing 85 to the compressed-air cylinder H, that is secured to the cross-head D by suitable brackets 86. Preferably the cylinder H is arranged at an inclination (see Fig. 1) in order that the cylinder may be readily drained, and the end of the cylinder is furnished with a screw cap or cock to permit it to be conveniently cleaned. This cylinder and the air-passages of the filler-head may be conveniently cleaned by attaching to the end of the cylinder a hose leading to a tank of soda-water or like cleansing liquid in superatmospheric pressure, the liquid being thus forced through the air-cylinder H and the air-passages of the filler-head serving to remove any impurities that may have lodged therein.

Within the casing 83 is mounted the back-pressure valve K, that is sustained by an arm pivoted to the wall of the casing. Through the back-pressure valve K is formed a small port $k$, through which air will leak or escape when the valve K is closed against its seat. The valve K when air is to be admitted to the bottles will open freely, but when liquid is admitted to the bottles the valve K will close, and the air displaced in the bottles by the incoming liquid must escape through the choked port $k$ of the valve K, thereby maintaining sufficient excess back pressure of air within the bottles to prevent the foaming of the beer therein.

The preferred valve mechanism for controlling the passage of liquid and air through the filler-heads is that illustrated in Figs. 15 and 17 of the drawings, and comprises a disk-shaped valve M, mounted upon a central stem $m$ and between seats 87 and 88 of vitrified rubber or like material, these seats being formed with holes corresponding to the passages for air and liquid formed in the filler-heads. Each valve M is formed with a port $m'$ for liquid and a port $m^2$ for air, these ports being so located as to be brought coincident with the corresponding liquid and air passages of the filler-head. An important feature of this invention is the provision of valve mechanism of such character that air shall be admitted to the bottles to be filled in advance of the admission of the beer or like liquid, and where a single valve is used for controlling the flow of both air and liquid the port $m^2$ for air will be given a lead, so that when the valve is turned toward open position air will be admitted to the bottle slightly before the liquid is allowed to pass thereto. In the form of valve shown this is accomplished by giving such length to the air-port $m^2$ of the valve that it will come coincident with the air-passage 81 before the port $m'$ of the valve comes opposite the channel 71 of the filler-head. The purpose of the float-valve G is to prevent the passage of beer or like liquid upward through the air-channel of the filler-head after the bottle has been filled, and it will be readily understood that when the liquid rises beneath the float-valve G this valve will be lifted and its conical upper end will close the bottom of the channel 81. The extreme upper end $g$ of the float-valve G is rounded or spherical, so as to insure a more accurate closing of the port 81 by such part of the valve.

In order to automatically shift the disk valves of the several filler-heads, the mechanism to be next described is preferably employed. From each disk valve M a stem 90 extends forwardly through a segmental slot 91 in the casing of the filler-head. Each stem 90 is shown as provided with an upturned end 92, and over the several ends of the upturned stems 90 sits a shifter-bar 93, that is hung from swinging angular links 94, bolted to the under side of the cross-head D. (See Figs. 1 and 7.) A rod 95 is pivoted centrally, as at 96, to the shifter-rod 93, and the outer end of this rod is pivoted, as at 97, to a rock-arm 98, that is splined to the upright rock-shaft 99. As shown in Figs. 1 and 3, the hub of the rock-arm 98 is formed with a peripheral groove 100, into which projects the end of a plate $d^3$, that is bolted to the under side of the cross-head D, adjacent its end. This rock-shaft 99 is stepped in a bearing 101 at the front of one of the standards 4 of the main frame and passes through holes in lugs $d^2$, that extend from the front of the cross-head D. (See Fig. 1.) It will thus be seen that the shifter-bar 93, the rod 95, and rock-arm 98 move with the cross-head, the rock-arm 98 being at all times keyed to the vertical rock-shaft 99. Upon the lower end of the rock-shaft 99 is keyed a rock-arm 102, that is pivotally connected by a link 103 to a rod 104, (see Fig. 13,) that extends rearwardly and is bolted to a stud 105, projecting from the standard 4 of the main frame. The pivot 106 at the outer end of the link 103 extends downwardly into proximity to the periphery of the disk C, and upon the periphery of this disk C are mounted the means for automatically effecting the shift of the filler-head valves. Preferably these shifting means consist of two cams 108 and 109, the cam 108 being provided with an inclined contact-face 110, a detent-surface 111, and a second inclined contact-face 112, while the cam 109 is formed with a single inclined contact-face 113. It will thus be seen that as the disk C revolves in the direction of the arrow, Fig. 13, the contact-face 110 of the cam 108 will first contact with the depending lower end of the pin 106, thereby shifting said pin and the parts connected therewith toward the right. This shift of the pin 106 will effect sufficient movement of the rock-shaft 99 to cause the shifter-bar 93, (see Fig. 5,) by its connection with the stems 90 of the disk valves M, to turn the disk valves until the air-ports $m^2$ of these valves are brought opposite the air-channels 81 in the filler-heads, and air under pressure will then pass through the filler-heads to the bottles to be filled. As the disk C continues to revolve the straight surface 111 will engage the pin 106 and the valves M will be retained temporarily in their partially-open condition, with the air-supply passing through the filler-heads to the bottles. As soon, however, as the contact-face 112 of the cam 108 strikes the pin 106 the shaft 99 will be further rocked and will cause the shifter 93 to further turn the disk valves M until the liquid-ports $m'$ of these valves come coincident with the liquid-channels 71 of the filler-heads, when beer will pass through the filler-heads into the bottles against the pressure of air previously admitted thereto. By reference to Fig. 1 of the drawings it will be seen that the cam 108 upon the disk C is located diametrically opposite the position of the clutch-shifting device 27 (see Fig. 4) on the disk B, and when the contact-face 112 of the cam 108 has thus effected the complete opening of the filler-head valves M the shifting device 27 will shift the clutch-yoke 22 and disengage the clutch member 20 from the gear-pinion 16, thereby temporarily arresting the further movement of the disks B and C, so that the filler-head valves will remain open until the bottles are filled. When the filling of the bottles has been effected, the operator by depressing the treadle E will disconnect the shifting device 27 from engagement with the extension 26 of the yoke 22, thereby causing the reëngagement of the clutch member 20 with the pinion 16, so as to continue the rotation of the disks B and C. As the disk C continues to revolve in the direction of the arrow, Fig. 13, the contact-face 13 of the cam 109 will strike the pin 106, thereby shifting said pin and parts connected therewith to the left and causing the rock-shaft 99 to move the shifter-bar 93 until the disk valves M of the filler-heads are turned to closed position, when the further flow of air and liquid through the filler-heads will be cut off.

The liquid-reservoir F will receive beer through one or more induction-pipes 120, that will be connected with the supply barrels or casks by suitable pipes, these induction-pipes 120 being each furnished with shut-off cocks 121. (See Fig. 8.) The induction-pipes 120 have their inner ends bent downwardly to a point adjacent the bottom of the reservoir, and each of the induction-pipes is provided with a by-pass valve P at a point above the level that will be assumed by the liquid within the reservoir. The purpose of the by-pass valves P is to prevent the passage of air down into and through the beer within the reservoir F after the supply of beer has been exhausted in the barrel or cask from which it is being drawn under superatmospheric pressure. Preferably each by-pass valve P consists of a short piece of rubber tubing formed with its lips $p$ flattened and standing normally together with slight pressure. In practice it is found that so long as beer is passing through the induction-pipes 120 the lips $p$ of the by-pass valve will remain closed. As soon, however, as air begins to enter through either of the induction-pipes 120 it will pass up through the lips of the by-pass valve P and will not pass down into the beer within the reservoir. Hence the agitation of the beer within the reservoir by passage of air therethrough is avoided. The purpose of providing a reservoir with two induction-pipes 120 is to enable the bottling operation to be carried on with the least possible delay, these induction-pipes being connected to separate casks or barrels under pressure. A screen 125, located within the reservoir F, serves to arrest any particles of foreign matter—such as pitch, shavings, or the like—that may enter through the induction-pipes 120.

To the reservoir F is connected a pipe 126, provided with a pressure-gage 127, and from this pipe 126 leads a branch pipe 128, provided with a cock 129 and connected by a T-coupling 130 to a pipe 131, leading to the source of superatmospheric pressure and to a pipe 132, leading to the casing of the differential relief-valve R.

By reference more particularly to Fig. 19 of the drawings it will be seen that the relief-valve R is provided with a diaphragm $r$, to one side of which is connected a valve S, adapted to close against its seat $s$, formed at the inner end of a tubular extension 135 of the relief-valve casing. The tubular extension 135 is provided with an escape-port 136 and its outer end is closed by a screw-threaded plug 137, that engages corresponding threads in the tubular extension 135 and is provided with a set-nut 138. Through the plug 137 extends the stem $s'$ of the valve S, and around this stem $s'$ is placed a coil-spring 139, that bears against the end of the plug and tends to force the valve S from its seat $s$. The amount of pressure exerted by the spring 139 may be regulated by the adjustment of the plug 137. The relief-valve casing R is connected by a pipe 140 to the top of the liquid-reservoir F, a cock 141 being preferably interposed in this pipe. From the face of the diaphragm $r$ opposite the valve S projects the stem $s^2$, that enters the tubular nozzle $r'$ of the valve-casing, and this stem $s^2$ is grooved longitudinally to admit the air from pipe 132 into the relief-valve casing. From the foregoing description it will be seen that if the superatmospheric pressure under which the bottling of the beer or like liquid is being effected is, for example, five pounds, then a pressure of five pounds will be exerted upon one side of the diaphragm $r$, while upon the opposite side of the diaphragm there will be exerted a like air-pressure plus the pressure due to the force of the spring 139. Inasmuch as the spring 139 exerts its pressure upon that side of the relief-valve diaphragm that is connected by the pipe 140 to the reservoir F it is apparent that the pressure maintained within the reservoir F will be equal to the working pressure of five pounds minus the pressure exerted by the spring 139. If, therefore, the spring 139 be set to exert a pressure upon the diaphragm $r$ of, say, two pounds, then when the pressure within the reservoir F exceeds three pounds the diaphragm $r$ will be shifted, so as to move the valve S from its seat and allow air to escape from the reservoir through the pipe 140, the relief-valve chamber and the tubular extension 135, and port 136 until the pressure within the reservoir is reduced to or below three pounds. By means of this differential relief-valve it will be seen that a substantially uniform variation in pressure will at all times be maintained between the working pressure under which the beer is delivered from the supply-barrels and the pressure within the reservoir, and consequently within the air-cylinder. This is a feature of importance for the reason that it prevents all danger of violent agitation and foaming of the beer within the reservoir, which would be produced by variations in the working pressure upon the supply-barrels if an ordinary blow-off or relief valve were used upon the reservoir.

The pipe 140, that connects the reservoir F with the casing R of the differential relief-valve, is threaded into a block or disk 145, attached to the interior of the reservoir F. This disk 145 is threaded to receive a flanged wing-nut 146, that sustains a flanged support 147, through which passes the stem of a check-valve 148, adapted to close the port that leads through the disk 145 to the pipe 140. The stem of the check-valve 148 is connected to the lever 149 of a float 150, this lever being pivoted, as at 151, to the part 147. Hence it will be seen that when the supply of liquid within the reservoir F rises sufficiently high the float 150 will be lifted, thereby causing the check-valve 148 to shut off the escape of air through the pipe 140, and so long as this valve 148 remains closed the further admission of liquid into the reservoir F through the induction-pipes 120 will be checked. From the top of the reservoir F leads a flexible pipe 152, whereby the reservoir is connected with the air-cylinder H.

Vertically through the cross-head D, adjacent its ends, extend the rods 160, the lower ends of which are connected to blocks 161, that slide upon the vertical supports 3 and 4. (See Figs. 1, 10, and 11.) The slide-blocks 161 have projecting therefrom the rods 163, that pass through holes in the blocks 164, that are free to slide upon the rods 163. Each of the blocks 164 is secured to an angular supporting-bar 165, that extends from side to side of the machine, between the standards 3 and 4, these angular supporting-bars 165 serving to sustain the sectional bottle-guides T. Each of the blocks 164 has journaled therein an antifriction-roller 166, the rollers 166 facing each other and being arranged in proximity, as shown. The supporting-bars 165 are drawn normally together by one or more coil-springs 167, although obviously, if preferred, springs might be mounted upon the rods 163. Each of the bottle-guides T is formed of opposing separable angular or V-shaped sections, one section of each guide being fixed to its appropriate support 165, and each of the sections of the bottle-guides is formed with an outwardly-flaring lower portion $t$ and preferably with an upper straight portion $t'$. The purpose in forming the bottle-guides with downwardly-flaring portions is to insure the accurate centering of the bottles, so that the filling-tubes 70, which pass through holes 168, formed in the supporting-bars 165 centrally of the bottle-guides, shall accurately enter the mouths of the bottles to be filled. By forming the bottle-guides of separable angular or V-shaped sections all danger of the binding of the guides upon the mouths of the bottles is prevented, so that no matter what may be the size of the bottle-mouth it cannot bind in the guides. In order to automatically open the sections of the bottle-guides, so as to permit the cushions or blocks 66 (see Fig. 15) of the filler-heads to descend onto the tops of the bottles, I provide the spreader-bars V, that are secured to and depend from the ends of the cross-head D at points above the rollers 166 of the bottle-guide supports. The lower ends of the spreader-bars V are pointed, so as to enter between the rollers 166, and thus spread these rollers, the supports 165, and the separable sections of the bottle-guides T in order to permit the lower ends of the filler-heads to pass down and onto the tops of the bottles. By reference to the position of the drawings, as illustrated in Fig. 12, it will be readily seen how the spreading of the sections of the bottle-guides is effected when the spreader-bars V are forced downward by the cross-head D. Upon the standards 3 and 4 are adjustably mounted by set-screws 180 the stop-blocks 181, that are adjusted upon the standards in keeping with the height of the bottles to be filled. These stop-blocks 181 engage the slide-blocks 161 as the latter move downward with the cross-head and arrest their further movement after the bottle-guides T have passed over the mouths of the bottles. Then as the cross-head D continues to descend the rods 160, (see Fig. 1,) that extend upward from the blocks 161, remain stationary until the filler-heads are brought into firm bearing against the tops of the bottles. The rods 161 are provided at their upper ends with adjustable collars 169, (see Fig. 1,) through which pass pins that enter holes formed in the rods 160 at different points adjacent their ends. By this means the rods 160 and the bottle-guides sustained thereby may be raised or lowered according to the height of the bottles to be filled and the corresponding length of the filling-tubes to be employed.

From the foregoing description the operation of my improved apparatus will be seen to be as follows: At the outset the operator will first establish connection between the supply-barrel from which the beer is to be drawn and the source of air-pressure in the usual manner. Then the supply barrel or barrels will be connected with the induction pipe or pipes 120, the cocks 121 being at such time in closed position. The hose 131 will also be connected with the source of superatmospheric pressure, the cock 129 being at such time closed. The operator will then first open the air-line cock 129 and establish a full initial pressure in the reservoir F. He will then close the air-line cock 129 and open the cock 141 between the relief-valve and the reservoir F. Then he will turn the adjustable plug 137 until the spring 139 is placed under the desired tension, so as to cause the valve S to be forced from its seat at the desired point of pressure below the working pressure under which the beer is delivered to the reservoir, and the lock-nut 138 will then be set in position. The operator will next open the cock 121 and allow the beer to flow into the reservoir until the proper level of beer is established, which will be indicated by the escape of air through the relief-chamber R, being cut off by the float 150 rising within the reservoir F and closing the valve 148. The beer, however, will continue to enter the reservoir after the float-control valve 148 is thus closed and until an equilibrium of pressure between the barrel and cylinder is established. A row of bottles will then be placed within the uppermost bottle-holders of the drum. The operator will then shift the clutch 49, thereby imparting revolution to the shaft 17 (see Fig. 1) and the disks B and C. The cross-head D is then drawn downward, and as it descends the bottle-guides T pass over the mouths of the bottles, thereby insuring the accurate entry of the filling-tubes into the bottles. At such time the slide-blocks 161 will contact with the stops 181, and as the cross-head D continues to descend the spreader-bars V will pass between the rollers 166 and will spread the bottle-guides T and their supporting-bars 165, so as to permit the filler-heads E' to pass downward until the cushions 66 of the filler-heads are brought against and establish an air-tight joint with the tops of the bottles. At such time the springs 61 around the stems of the individual filler-heads will be compressed, and the springs 36 on the pitman-rods 33 will also be compressed, the individual springs 61 insuring tight joints between the tops of the bottles and the filler-heads notwithstanding slight variations in the heights of the bottles. Immediately after this tight joint is made between the filler-heads and the tops of the bottles the contact-surface 110 (see Fig. 13) of the cam 108 will contact with the pin 106 and will turn the shaft 99 and actuate the shifter-bar 93, so as to turn the valves M of the filler-heads until the air-ports $m^2$ of these valves are coincident with the air-passages 81. Air will then pass from the air reservoir or cylinder H by the flexible tubes 85 through the casings 83 and the passages 81 into the bottles, the valves K (see Fig. 18) at such time lifting quickly to permit the free passage of the air. Air will thus be admitted to the bottles in manner before described in advance of the admission of beer thereto; but as soon as the contact-face 112 of the cam 108 strikes the pin 106 the valves M will be shifted so as to bring the fluid-ports $m'$ of the valves M coincident with the channel 71. Beer will then pass from the reservoir F through the flexible pipes 75 and to and through the filling-tubes 70 and will enter the bottles against the back pressure of air previously admitted thereto, the descent of beer into the bottles being by gravity only. At the same time the shifting device 27 on the disk B will have engaged the extension 26 on the yoke 22 and will have disengaged the clutch 20 from the gear-pinion 16. As soon as the beer begins to enter the bottles it reverses the air-currents and expels the air from the bottles back into the air-cylinder H and reservoir F, and in so doing the back-pressure valves K are closed against their seats. The contracted ports $k$ in the valves K, however, allow for a restricted escape of the air, thereby forming air-cushions between the back-pressure valves K and the bottles, which retard the flow of beer into the bottles and insure the delivery of the beer into the bottles in such a quiet and unexcited condition that there is no disposition on the part of the gas to leave the beer when the filler-heads are lifted from the bottles at the end of the filling operation. When the bottles have been completely filled with beer, the beer will rise up into the chamber beneath the float-valves G of the filler-heads, and these float-valves thereupon instantly close the air-passages 81 of the filler-heads and prevent the beer from going farther along the air-passages. In case of variation in the capacity of the bottles the float-valves G insure the complete filling of all bottles without danger of passage of beer back into the air-passages leading from the filler-heads. When the bottles have been completely filled, the operator will place his foot upon the treadle E and will thereby cause the disengagement of the shifting device 27 from the extension 26 of the clutch-yoke 22. The clutch member 20 will then reengage the pinion 16, and the disks B and C will have revolution imparted thereto, which will cause the cross-head D and parts connected therewith to return to the uppermost position. (Shown in Fig. 1.) It will be seen that as the disk C is thus revolved the contact-surface 113 of the cam 109 will contact with the pin 106, (see Fig. 13,) thereby causing the shifter-bar 93 to turn the disk valves M and cut off further passage of air and beer through the filler-heads. The attendant will then remove the filled bottles from the drum, and the partial revolution of the drum will supply a new row of empty bottles in the row of bottle-holders that will be next brought beneath the bottle-guides. It will be understood that as the cross-head $d$ is being raised and lowered in manner above described the bottle-carrying drum A will have a partial revolution imparted thereto by the mechanism hereinbefore described, the drum being held in true and accurate position by the spring-actuated detent 52, (see Fig. 3,) as above set forth. As the filler-heads are lifted from a row of filled bottles the capillary filling-tubes 70 will retain the beer therein, so that when the tubes 70 enter a row of empty bottles the beer will be delivered at once to the bottoms of the bottles. After the supply cask or barrel has been emptied if air be driven through the hose leading to the induction pipe or pipes 120 its passage into the reservoir through the pipes 120 will be resisted by the beer within the submerged ends of the induction-pipes, and this resistance will be sufficient to cause the air to open the delicate by-pass valve P and pass directly into the top of the reservoir without agitating the beer in the reservoir. As soon as the beer within the reservoir F is delivered into the bottles in manner above described the level within the reservoir is lowered and the check-valve 148 is opened by the descent of the float 150, so that air passing from the bottles and back into the reservoir F may escape through the differential relief-valve chamber in manner before described.

While I have described what I regard as the preferred embodiment of the invention, it is manifest that the details of construction above set out may be varied within wide limits by the skill of the mechanic and that features of the invention may be employed without its adoption as an entirety. Thus, for example, it is not essential that the back-pressure valve K should be provided with a leak-port if a by-pass port were arranged to permit a restricted backflow of air from the bottles during the filling operation. The location, however, of the leak-port $k$ in the valve K is a very convenient one. So, also, it is manifestly not essential that the differential relief-valve should be mounted directly upon the reservoir F, although this is the preferred location, the main desideratum being that the differential relief-valve shall be in communication, direct or indirect, with the air-cylinder, to which the air-pipes lead from the filler-heads. Many other variations in detail may readily suggest themselves to the skilled mechanic.

Having thus described my invention, what I claim as new, and desire to secure by Letters Patent, is—

1. In a bottle-filling machine, the combination with suitable filling-tubes and with means for raising and lowering said tubes to insert them into and withdraw them from the bottles, of a bottle-carrier mounted to revolve in a vertical plane beneath said bottle-filling tubes and provided with transverse rows of bottle-holders, and mechanism for automatically effecting the intermittent revolution of said bottle-carrier and for automatically raising and lowering said bottle-filling tubes in unison with the movement of said bottle-carrier.

2. In a bottle-filling machine, the combination with suitable filling-tubes and with means for raising and lowering said tubes, of a bottle-carrier consisting of a drum provided with transverse rows of bottle-holders, comprising radially-disposed supports having oppositely-arranged spring-seated jaws, and mechanism for intermittently revolving said drum.

3. In a bottle-filling machine, the combination with suitable filling-tubes and with means for raising and lowering said tubes, of a bottle-holder comprising oppositely-disposed, fixed supports or brackets, movable jaws for grasping the bottle carried by said fixed supports, said jaws having outwardly-flaring ends to admit the bottles and springs for pressing said jaws normally toward each other.

4. In a bottle-filling machine, the combination with suitable filling-tubes and with means for raising and lowering said tubes, of a revoluble bottle-carrier mounted to revolve in a vertical plane beneath said filling-tubes, said bottle-carrier being provided with transverse rows of bottle-holders comprising supports having radially-disposed spring-seated jaws to receive the bottles.

5. In a bottle-filling machine, the combination with suitable filling-tubes and with means for raising and lowering said tubes, of a revoluble bottle-carrier, a horizontal shaft whereon said bottle-carrier is loosely mounted, revoluble parts fixed to said shaft and connected to the means for raising and lowering the filling-tubes, and suitable means between said revoluble parts and said bottle-carrier, whereby the bottle-carrier is moved in correspondence with the raising and lowering of said tubes.

6. In a bottle-filling machine, the combination with suitable filling-tubes and with means for raising and lowering said tubes, of a bottle-carrier consisting of a drum provided with transverse rows of bottle-holders and mechanism for intermittently revolving said drum, comprising a ratchet-wheel connected to said drum, a pawl for engaging said ratchet-wheel, a cam or eccentric part for shifting said pawl and gearing for revolving said cam or eccentric part.

7. In a bottle-filling machine, the combination with filling-tubes and with means for raising and lowering said tubes, of a bottle-carrier consisting of a drum provided with transverse rows of bottle-holders, and mechanism for intermittently revolving said drum, comprising a ratchet-wheel connected to said drum, a shaft whereon are loosely supported said drum and ratchet-wheel, a pawl engaging said ratchet-wheel, a cam or eccentric part mounted upon said shaft for shifting said pawl, a gear-wheel fixed to said shaft and means for revolving said gear-wheel.

8. In a bottle-filling machine, the combination with filling-tubes and with means for raising and lowering said tubes, of a suitable bottle carrier or support provided with transverse rows of bottle-holders, suitable gearing for driving said carrier, a clutch for throwing said gearing into and out of engagement with the source of power, and means for automatically shifting said clutch to throw said gearing out of action during the filling operation.

9. In a bottle-filling machine, the combination with suitable filling-tubes and with means for raising and lowering said tubes, of a bottle-carrier consisting of a drum provided with transverse rows of bottle-holders and mechanism for intemittently revolving said drum, comprising a ratchet-wheel connected to said drum, a pawl for engaging said ratchet-wheel, means for actuating said pawl, gearing for driving said pawl-actuating means, a clutch between said gearing and the source of power and means for automatically shifting said clutch to throw said gearing out of action.

10. In a bottle-filling machine, the combination with filling-tubes and with means for raising and lowering said tubes, of a revoluble bottle-carrier provided with transverse rows of bottle-holders, suitable gearing for driving said bottle-carrier, a clutch for throwing said gearing into and out of engagement with the source of power, a yoke for operating said clutch and a revoluble shifter actuated by the mechanism that effects the raising and lowering of the filling-tubes for moving said yoke to throw said clutch out of action.

11. In a bottle-filling machine, the combination with filling-tubes and with means for raising and lowering said tubes, of a revoluble bottle-carrier provided with transverse rows of bottle-holders, suitable gearing for driving said bottle-carrier, a clutch for throwing said gearing into and out of engagement with the source of power, a yoke for operating said clutch, a revoluble shifter actuated by the mechanism that effects the raising and lowering of the filling-tubes for moving said yoke to throw said clutch out of action, and a release device to disengage said shifter from the yoke in order to permit the reëngagement of the clutch mechanism.

12. In a bottle-filling machine, the combination with filling-tubes and with means for raising and lowering said tubes, of a bottle-carrier consisting of a drum provided with transverse rows of bottle-holders, suitable gearing for driving said drum, a clutch for throwing said gearing into and out of engagement with the source of power, a yoke for operating said clutch, a revoluble shifter actuated by the mechanism that effects the raising and lowering of the filling-tubes for moving said yoke to throw said clutch out of action, and a release device to disengage said shifter from the yoke in order to permit the reëngagement of the clutch mechanism, said release device comprising a treadle and a part arranged to engage said shifter.

13. In a bottle-filling machine, the combination with filling-tubes and with means for raising and lowering said tubes, of a bottle-carrier consisting of a drum provided with transverse rows of bottle-holders, mechanism for intermittently revolving said drum and means for accurately arresting and holding said drum in position for the filling-tubes to enter the bottles.

14. In a bottle-filling machine, the combination with filling-tubes and with means for raising and lowering said tubes, of a bottle-carrier consisting of a drum provided with transverse rows of bottle-holders, mechanism for intermittently revolving said drum, means for accurately arresting and holding said drum in position for the filling-tubes to enter the bottles, comprising a notched ring connected with the drum, and a beveled spring-actuated pawl engaging said notched ring.

15. In a bottle-filling machine, the combination with filling-tubes and with means for raising and lowering said tubes, of a bottle-carrier consisting of a drum provided with transverse rows of bottle-holders and mechanism for intermittently revolving said drum, comprising a ratchet-wheel connected to said drum, a pawl engaging said ratchet-wheel, a rock-shaft carrying said pawl, an arm connected with said rock-shaft, a revoluble cam for shifting said arm and suitable gearing for driving said cam.

16. In a bottle-filling machine, the combination with filling-tubes and with means for raising and lowering said tubes, of a revoluble bottle-carrier provided with transverse rows of bottle-holders, mechanism for intermittently revolving said bottle-carrier, a reciprocating cross-head supported by that part of the main frame above the bottle-carrier, gear mechanism for driving said bottle-carrier and pitman-rods connecting said gear mechanism with said cross-head.

17. In a bottle-filling machine, the combination with a suitable bottle-support and with a filling tube and head, of means for insuring the accurate entry of the filling-tube into the bottle, comprising a guide formed of flaring separable sections and means for spreading said sections as the filler-head approaches the mouth of the bottle.

18. In a bottle-filling machine, the combination with a suitable bottle-support and with a filling tube and head, of means for insuring the accurate entry of the filler-tube into the bottle, comprising a guide formed of separable V-shaped sections, said sections being formed with downwardly-flaring walls to engage the top of the bottle.

19. In a bottle-filling machine, the combination with a suitable bottle-support and with a filling tube and head, of means for insuring the accurate entry of the filling-tube into the bottle, comprising a guide formed of separable V-shaped sections, said sections being formed with downwardly-flaring walls to engage the top of the bottle and being formed also with sectional chambers above said flaring walls.

20. In a bottle-filling machine, the combination with a suitable bottle-support and with a filling tube and head, of means for insuring the accurate entry of the filling-tube into the bottle, comprising a guide formed of flaring separable sections, means for spreading said sections as the filler-head approaches the mouth of the bottle, and spring mechanism for returning said separable sections to closed position.

21. In a bottle-filling machine, the combination of a bottle-carrier provided with suitable rows of bottle holders or supports, a reciprocating cross-head provided with a plurality of filler heads and tubes and means for insuring the accurate entry of the filling-tubes into the bottles, comprising a series of guides formed of flaring separable sections and means for spreading said sections as the filler-heads approach the tops of the bottles.

22. In a bottle-filling machine, the combination with a bottle-carrier provided with suitable rows of bottle holders or supports, a reciprocating cross-head provided with a plurality of filler heads and tubes and means for insuring the accurate entry of the filling-tubes into the bottles, comprising oppositely-disposed movable supports, bottle-guides consisting of separable flaring sections mounted upon said supports, means for spreading said supports and said bottle-guides before the cross-head completes its downward travel and adjustable stops for arresting said supports and bottle-guides before the filler-heads reach the tops of the bottles.

23. In a bottle-filling machine, the combination with a bottle-carrier provided with suitable rows of bottle holders or supports, a reciprocating cross-head provided with a plurality of filler heads and tubes and means for insuring the accurate entry of the filling-tubes into the bottles, comprising a series of guides formed of flaring separable sections, oppositely-disposed supports for said guides, adjustable rods connecting said guide-supports with said cross-head and means for spreading said guide-supports as the filler-heads approach the tops of the bottles.

24. In a bottle-filling machine, the combination with the revoluble bottle-carrier and with mechanism for intermittently operating the same, of a vertically-movable cross-head provided with a plurality of filler-heads having individual valves for controlling the passage of air and liquid to the bottles and means for automatically operating said valves in unison comprising a shifter-bar extending across said filler-heads and connected to said individual valves and means whereby said shifter-bar is actuated in unison with the mechanism that operates the bottle-carrier.

25. In a bottle-filling machine, the combination with a bottle-carrier and with means for moving said bottle-carrier to successively present rows of bottles to be filled, of a vertically-reciprocating cross-head, a series of filler-heads carried by said cross-head and provided with valves for controlling the passage of air and liquid to the bottle, a shifter connected to said valves and means controlled by the mechanism that shifts said cross-head for automatically operating said shifter to open and close the valves of the filler-heads.

26. In a bottle-filling machine, the combination of a revoluble bottle-carrier provided with transverse rows of bottle holders or supports, mechanism for intermittently revolving said bottle-carrier to present successive rows of bottles to be filled, a vertically-reciprocating cross-head arranged above said bottle-carrier and provided with a plurality of filler-heads and tubes, suitable connections between said cross-head and the bottle-carrier-actuating mechanism, valves carried by said filler-heads for controlling the passage of air and liquid to the bottles, a shifter connected with the valves of the several filler-heads, and a revoluble disk or part suitably connected with the drive mechanism that actuates said cross-head and provided with means for controlling the movement of said valve-shifter.

27. In a bottle-filling machine, the combination of a bottle-carrier provided with transverse rows of bottle holders or supports, mechanism for intermittently moving said bottle-carrier to present successive rows of bottles to be filled, a vertically-reciprocating cross-head arranged above said bottle-carrier and provided with a plurality of filler-heads and tubes, suitable connections between said cross-head and the mechanism that actuates the bottle-carrier, valves carried by said filler-heads for controlling the passage of air and liquid to the bottles, a shifter comprising a rod extending across said filler-heads and connected to the valves thereof, a revoluble device connected with the drive mechanism of the cross-head for actuating said shifter and suitable connections leading from said shifter to said revoluble device.

28. In a bottle-filling machine, the combination of a bottle-carrier, mechanism for intermittently moving said carrier to present successive rows of bottles to be filled, a vertically-reciprocating cross-head arranged above said carrier and provided with a plurality of filler heads and tubes, suitable connections between said cross-head and the carrier-actuating mechanism, valves carried by said filler-heads for controlling the passage of air and liquid to the bottles, a shifter comprising a rod extending across said filler-heads and connected to the valves thereof, a revoluble disk or part connected with the mechanism that actuates said cross-head, cams mounted upon said revoluble disk or part for actuating said valve-shifter and suitable connections between said valve-shifter and said cams.

29. In a bottle-filling machine, the combination with the bottle-support, a reservoir for beer and air under pressure, a filler-head provided with separate channels for air and beer connected to said beer-reservoir, a valve within said filler-head provided with separate ports therethrough for the passage of air and liquid, mechanism for raising and lowering said filler-head and means for automatically shifting said valve after the filler-head completes its descent, the air-port of said valve being arranged to admit air into the bottle in advance of the admission of liquid thereto.

30. In a bottle-filling machine, the combination with a bottle-support, of a filler-head comprising a casing having ports therethrough for passage of air and liquid, a single disk valve arranged within said casing and having separate ports extending vertically therethrough for passage of air and liquid, and a stem extending from said disk valve outside the valve-casing whereby said valve may be shifted.

31. In a bottle-filling machine, the combination with a bottle-support, of a filler-head comprising a casing having ports therethrough for passage of air and liquid, a single disk valve arranged within said casing and having separate ports therethrough for passage of air and liquid, the air-port of said disk valve being provided with a "lead" whereby it is opened in advance of the liquid-port, and a stem whereby said valve is shifted.

32. In a bottle-filling machine, the combination with a bottle-support, of a filler-head provided with a packing to engage the mouth of the bottle, air and liquid passages extending through said packing, a valve for controlling the passage of air and liquid through said filler-head and a float-valve for automatically preventing the flow of liquid into said air-passage from the bottle.

33. In a bottle-filling machine, the combination with a bottle-support, of a filler-head provided with a packing to engage the mouth of the bottle, air and liquid passages extending through said packing, a valve for controlling the passage of air and liquid through said filler-head and a float-valve arranged within said air-passage and serving to prevent the flow of liquid into said passage from the bottle.

34. In a bottle-filling machine, the combination with a bottle-support, of a filler-head provided with a packing to engage the mouth of the bottle, an opening through said packing, a passage for liquid extending vertically through said filler-head and through said opening in the packing, an air-passage communicating with said opening, a horizontal disk valve having openings therethrough adapted to be brought coincident with said air and liquid passages and a stem extending from said disk valve outside the casing for shifting said valve.

35. In a bottle-filling machine, the combination with the bottle-support, of a filler-head provided with a vertical passage therethrough for liquid, a valve for controlling the flow of liquid through said passage, and a capillary filling-tube having its upper end inserted within said filler-head and having its bore coincident with said vertical passage of the filler-head.

36. In a bottle-filling machine, the combination with a filler-head provided with passages for air and liquid, means whereby the full pressure of air is unrestrictedly admitted to the bottles prior to the admission of liquid thereto and whereby a restricted escape of air from the bottles will occur during the filling operation.

37. In a bottle-filling machine, the combination with a filler-head provided with passages for air and liquid, of an air-channel provided with a valve to permit the free passage of air to the bottle to be filled and provided with a reduced port or passage for the escape of air from the bottle during the filling operation.

38. In a bottle-filling machine, the combination with a suitable bottle-support, of a filler-head for engaging the top of the bottle, said filler-head being provided with passages for air and liquid, valve mechanism for controlling the passage of air and liquid through said filler-head and a back-pressure valve connected with the air-passage and having a reduced port to restrict the escape of air from the bottle during the filling operation.

39. In a bottle-filling machine, the combination with a suitable bottle-support, of a filler-head for engaging the top of the bottle, said filler-head being provided with passages for air and liquid, valve mechanism for controlling the passage of air and liquid through said filler-head and a back-pressure valve connected with the air-passage and having a reduced port to restrict the escape of air from the bottle during the filling operation, said back-pressure valve being pivoted to move freely in one direction to permit a full admission of air to the bottle.

40. In a bottle-filling machine, the combination with a filler-head and with means for supplying liquid thereto under pressure, and with an air-reservoir suitably connected to said filler-head, of a differential relief-valve in suitable connection with said air-reservoir.

41. In a bottle-filling machine, the combination with the filler-head having passages therethrough for air and liquid, of a reservoir, pipes for air and liquid connecting said reservoir with said filler-head, an induction-pipe for connecting said reservoir with the source of liquid-supply, and a differential relief-valve connected to said reservoir.

42. In a bottle-filling machine, the combination with the filler-head having passages therethrough for air and liquid, of a reservoir, pipes for air and liquid connecting said reservoir with said filler-head, an induction-pipe for connecting said reservoir with the source of liquid-supply, and a differential relief-valve connected to said reservoir and provided with a pipe for connecting said relief-valve to the source of air-supply.

43. In a bottle-filling machine, the combination with the filler-head having passages therethrough for air and liquid, of a reservoir, pipes for air and liquid connecting said reservoir with said filler-head, an induction-pipe for connecting said reservoir with the source of liquid-supply, and a differential relief-valve connected to said reservoir, said relief-valve comprising a casing provided with a diaphragm, a spring and means for adjusting said spring at one side of said diaphragm whereby the pressure within the reservoir may be maintained at any desired point below the pressure whereby the liquid is delivered into the reservoir.

44. In a bottle-filling machine, the combination with the filler-head having passages therethrough for air and liquid, of a reservoir, pipes for air and liquid connecting said reservoir with said filler-head, an induction-pipe for connecting said reservoir with the source of liquid-supply, and a differential relief-valve connected to said reservoir, said relief-valve comprising a casing having a ported tubular extension at one side thereof, a diaphragm within said casing, a stem extending from said diaphragm and carrying a valve to close said tubular extension, a spring within said tubular extension, an adjustable plug or device for varying the force of said spring, and a pipe for connecting said casing with the source of air-supply.

45. In a bottle-filling machine, the combination with the filler-head having passages therethrough for air and liquid, of a reservoir, pipes for air and liquid connecting said reservoir with said filler-head, an air-induction pipe for connecting said reservoir with the source of air-supply, a relief-valve connected to said reservoir, a cut-off valve for closing the passage between the reservoir and the relief-valve, and a float within the reservoir for controlling said cut-off valve.

46. In a bottle-filling machine, the combination with the filler-head having passages therethrough for air and liquid, of a reservoir, pipes for air and liquid connecting said reservoir with said filler-head, an air-induction pipe for connecting said reservoir with the source of air-supply, and a by-pass valve for air connected to said induction-pipe within the reservoir and at a point above the level to which the liquid will rise in said reservoir.

47. In a bottle-filling machine, the combination with the filler-head having passages therethrough for air and liquid, of a reservoir, pipes for air and liquid connecting said reservoir with said filler-head, an induction-pipe for connecting said reservoir with the source of liquid-supply, and a by-pass valve for air connected to said induction-pipe within the reservoir and at a point above the level to which the liquid will rise in said reservoir, the said by-pass valve consisting of a rubber tube having normally closed lips.

GEORGE F. SUMNER.

Witnesses:
GEO. P. FISHER, Jr.,
ALBERTA ADAMICK.